United States Patent
Wardman

(10) Patent No.: US 10,523,637 B2
(45) Date of Patent: Dec. 31, 2019

(54) ANONYMOUS ACCOUNT SECURITY EXCHANGE

(71) Applicant: PAYPAL INC., San Jose, CA (US)

(72) Inventor: Bradley Wardman, Phoenix, AZ (US)

(73) Assignee: PAYPAL, INC., San Jose, CA (US)

( * ) Notice: Subject to any disclaimer, the term of this patent is extended or adjusted under 35 U.S.C. 154(b) by 236 days.

(21) Appl. No.: 15/194,722

(22) Filed: Jun. 28, 2016

(65) Prior Publication Data

US 2017/0026343 A1 Jan. 26, 2017

Related U.S. Application Data

(60) Provisional application No. 62/195,453, filed on Jul. 22, 2015.

(51) Int. Cl.
*H04L 29/06* (2006.01)
*G06F 21/62* (2013.01)

(52) U.S. Cl.
CPC ...... *H04L 63/0421* (2013.01); *G06F 21/6263* (2013.01); *H04L 63/0428* (2013.01); *H04L 63/06* (2013.01); *H04L 63/102* (2013.01); *H04L 63/1433* (2013.01)

(58) Field of Classification Search
CPC ............... H04L 63/0421; H04L 63/102; H04L 63/1433; H04L 63/0428; H04L 63/06; G06F 21/6263
See application file for complete search history.

(56) References Cited

U.S. PATENT DOCUMENTS

| | | | |
|---|---|---|---|
| 7,165,182 B2 | 1/2007 | Excoffier et al. | |
| 8,640,231 B2 | 1/2014 | Florencio et al. | |
| 9,300,629 B1 | 3/2016 | Jahr | |
| 2004/0098337 A1* | 5/2004 | Gudgeon | G06Q 20/108 705/42 |
| 2005/0114673 A1 | 5/2005 | Raikar et al. | |

(Continued)

OTHER PUBLICATIONS

Samson, Ted, Study finds high rate of password reuse among users, Feb. 10, 2011, 2 pages http://www/infoworld.com/article/2623504/data-security/study-finds-high-rate-of-password-reuse-among-users.html.

(Continued)

*Primary Examiner* — Harunur Rashid
(74) *Attorney, Agent, or Firm* — Haynes and Boone LLP

(57) ABSTRACT

Methods, systems, and computer program products for providing anonymized account security services are disclosed. For example, a computer-implemented method may include an anonymous account security exchange for receiving anonymized user account information for a first user account identified as a security risk from a first organization associated with the first user account, receiving anonymized user account information for a second user account from a second organization associated with the second user account, determining that the anonymized account identifier associated with the first user account matches the anonymized account identifier associated with the second user account, and providing a notification to the second organization indicating that the second user account is associated with a different user account identified as a security risk by another organization.

22 Claims, 5 Drawing Sheets

(56) References Cited

U.S. PATENT DOCUMENTS

| | | | |
|---|---|---|---|
| 2010/0205077 A1* | 8/2010 | Hammad | G06Q 20/04 |
| | | | 705/30 |
| 2013/0014236 A1* | 1/2013 | Bingell | H04L 63/0846 |
| | | | 726/6 |
| 2013/0024238 A1* | 1/2013 | Nielson | G06Q 40/06 |
| | | | 705/7.28 |

OTHER PUBLICATIONS

Grimes, Roger A., Password reuse opens doors for cyber criminals, Feb. 15, 2011, 2 pages http://www/infoworld.com/article/2623343/data-security/password-reuse-opens-doors-for-cyber-criminals.html.

Hessinger, Shawn, Microsoft Hack Attack: A Wake Up Call Not to Reuse Passwords, Posted on Feb. 25, 2013 in Technology Trends, 3 pages, http://smallbiztrends.com/2013/02/microsoft-hack.html.

Vijayan, Jaikumar, Google Chrome Extension Warns Against Password Reuse, eWEEK, posted Apr. 29, 2015, 2 pages http://www.eweek.com/security/google-chrome-extension-warns-against-password-reuse.html.

Dashlane, The world's best password manager & secure digital wallet, Jan. 21, 2016, 4 pages https://www.dashlane.com/.

Chen, Brian X., Apps to Manage Passwords So They Are Harder to Crack Than 'Password' The New York Times, Jan. 20, 2016, 5 pages, http://www.nytimes.com/2016/01/21/technology/personaltech/apps-to-manage-passwords-so-they-are-harder-to-crack-than-password.html?_r=0.

Dashlane, The password manager, perfected., May 7, 2016, 6 pages https://www.dashlane.com/passwordmanager.

* cited by examiner

ANONYMOUS ACCOUNT SECURITY EXCHANGE

CROSS-REFERENCE TO RELATED APPLICATION

The present application claims priority to and the benefit of U.S. Provisional Patent Application No. 62/195,453, filed on Jul. 22, 2015, which is hereby incorporated by reference in its entirety.

TECHNICAL FIELD

The present disclosure generally relates to computer systems and, more particularly, to the security of computer systems and Internet services.

BACKGROUND

Cybercrime generally refers to criminal activity involving computer systems. Such criminal activity includes the use of computer systems to perpetrate crimes and illegally access private electronic data. Cybercriminals may gain access to private user account information in a number of ways. For example, cybercriminals may obtain user account credentials and information by exploiting weaknesses in centralized computer systems, by infiltrating local computer systems of users, by deceiving users into providing account information, by stealing user account information directly from a source, and by intercepting user account information from a user or network.

Online user identities often are interconnected across various organizations and intertwined with the lives of users. For example, a user may provide different organizations with the same e-mail address managed by an e-mail service provider. In one example, a user may provide the same e-mail address to various merchants, businesses, government agencies, service providers, or other organizations as a unique username or contact information.

In addition, online accounts and identities of users often are accessible via an e-mail account of a user. For example, an e-mail account may be used to access and reset other accounts associated with merchants, financial institutions, social networks, and various online services. Thus, a cybercriminal may use e-mail account credentials of a user to compromise other accounts of the user.

Information privacy generally refers to the protection of sensitive user data. For example, data privacy rules and regulations may be defined and enforced by federal, state, and local government agencies. Various industries and organizations also may define and self-regulate user data privacy. Such regulations generally place tight controls and restrictions over data sharing. Thus, organizations generally are prohibited from sharing details about user account information, even in a security-related context.

Therefore, providing new and improved ways of preventing, identifying, mitigating, and resolving illegal online activity while maintaining the highest standards for the data privacy are of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
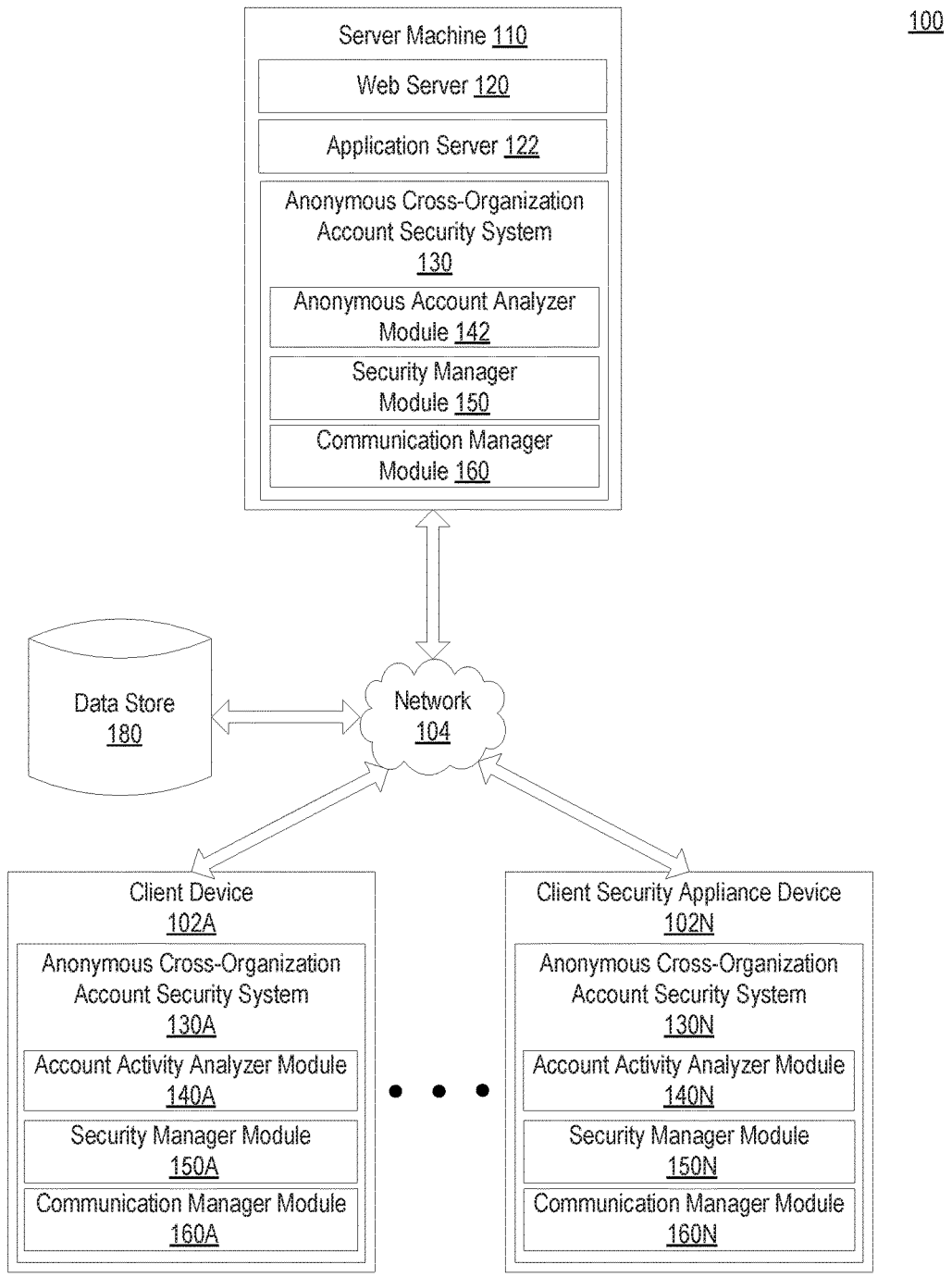
FIG. 1 is a block diagram illustrating a system architecture, in accordance with various examples of the present disclosure.

Systems, methods, and computer program products for providing anonymous account security services are disclosed. Criminals may attempt to gain access to one or more user accounts associated with an organization or person. If successful, criminals can use information associated with compromised accounts to access and exploit other related accounts.

For example, criminals can use a compromised e-mail account to learn about other online accounts held by the same person (e.g., with merchants, financial institutions, online marketplaces, online service providers, social media providers, other e-mail providers, etc.). Criminals then may reset the passwords and exploit the other online user accounts associated with a compromised e-mail account. In other examples, user accounts of a person may be compromised by criminals in situations where someone uses a similar or the same user identifier and password combination across various different accounts.

Today, organizations generally do not share information about compromised user accounts. For example, data privacy laws and regulations restrict the sharing of user information outside of an organization. Further, the Internet lacks a centralized security framework and provider to integrate security information and practices across many thousands of online service provider organizations.

In examples of the present disclosure, an anonymous account security data exchange provides services that allow various organizations to share anonymized user account information for security and risk mitigation purposes. Such data is provided, compared, correlated, matched, and reported in an anonymized form to maintain data privacy and to remain in compliance with various privacy laws and regulations.

In an example, an organization analyzes user account activity, detects anomalous user account behavior, and determines that the user account is a security risk. The organization then determines that user account information is to be shared anonymously with a centralized anonymous account security data exchange. The organization anonymizes and sends the anonymized user account information to the account security data exchange for comparison against other anonymized user account information provided by different organizations.

In an example, the account security data exchange receives anonymized user account information from various organizations. The account security data exchange compares and matches anonymized account identifiers and other fields of anonymized user account records from different organizations. The account security data exchange then reports matching anonymized user account information back to the respective organization. The organization de-anonymizes the anonymized account identifiers received from the account security data exchange and performs one or more risk mitigation activities involving the user accounts.

In an example, anonymization performed to user account information renders the original data unintelligible and indecipherable. The anonymization protects data privacy so that the meaning of the original data remains secret and unknown to any other organization, including an anonymous account security data exchange. For example, an account security data exchange may receive and analyze anonymized user account data from various organizations without deciphering the data. In an example, the anonymous account security data exchange receives, stores, maintains, compares, searches, locates, finds, correlates and matches various anonymized user account information (e.g., anonymized identifiers, records, fields, etc.) in their respective anonymized form(s).

Accordingly, aspects of the present disclosure allow organizations to share user account information for security-related purposes in a protected way that preserves data privacy and to remain in compliance with data privacy laws and regulations.

FIG. 1 illustrates an exemplary system architecture 100 in which examples of the present disclosure may be implemented. System architecture 100 includes one or more server machine(s) 110, one or more data store(s) 180, one or more client device(s) 102A, and one or more specialized or dedicated client security appliance device(s) 102N connected via one or more network(s) 104.

Network 104 may be a public network (e.g., the Internet), a private network (e.g., local area network (LAN) or wide area network (WAN)), or any combination thereof. In an example, network 104 may include the Internet, one or more intranets, wired networks, wireless networks, and/or other appropriate types of communication networks. Network 104 also may comprise a wireless telecommunications network (e.g., cellular phone network) adapted to communicate with other communication networks, such as the Internet. In addition, network 104 may include one or more short-range wireless networks or beacon networks.

Data store 180 generally refers to persistent storage capable of storing various types of data, such as text, audio, video, and image content. In some examples, data store 180 may include a network-attached file server, while in other examples data store 180 may include other forms of persistent storage such as an object-oriented database, a relational database, and so forth.

Client device 102A generally may be a personal computer (PC), laptop, mobile phone, tablet computer, server computer, wearable computing device, or any other type of computing device (i.e., a client machine). Client device 102A may run an operating system (OS) that manages hardware and software of the client device 102A. A browser (not shown) may run on client device 102A (e.g., on the OS of client device 102A). The browser may be a web browser that can access content and services provided by web server 120, application server 122, or a combination of web server 120 and application server 122. Other types of computer programs and computer scripts also may run on client device 102A.

Client security appliance device 102N generally refers to a specialized or dedicated client device (i.e., client machine) used to secure an organization and its data. In an example, client security appliance device 102N may include one or more of a server computer, router, a switch, a firewall, a dedicated computing device, a shared computing device, a virtual machine, etc. In one example, client security appliance device 102N performs activities associated with anonymous cross-organization account security system 130 in addition to one or more other security activities, such as network security, application security, file security, etc.

Client security appliance device 102N also may be a dedicated security device that a respective organization uses to participate in an anonymous inter-organizational account security data exchange with other organizations. An anonymous inter-organizational account security data exchange generally refers to one or more centralized computer systems where organizations send anonymized user account information or other related data to be compared and matched to anonymized information submitted by other organizations. In an example, each organization contracts and interacts with the centralized exchange instead of contracting and interacting directly with each of the other organizations participating in the exchange.

Server machine(s) 110, client device(s) 102A, and client security appliance device(s) 102N each may include a respective account activity analyzer module (e.g., such as account activity analyzer module 140A, 140N), anonymous account analyzer module (e.g., such as anonymous account analyzer module 142), security manager module (e.g., such as security manager module 150, 150A, 150N), and communication manager module (e.g., such as communication manager module 160, 160A, 160N). In various examples, such modules may be combined, divided, and organized in various arrangements on one or more computing devices.

Server machine 110 may include one or more web servers 120 and application servers 122. Web server 120 may provide text, audio, image, and video content from server machine 110 or other sources (e.g., data store 180) to client device 102A and client security appliance device 102N. Web server 120 also may provide web-based application services, business logic, and updates to client device 102A and client security appliance device 102N. Client device 102A and client security appliance device 102N may locate, access, and consume various forms of content and services from web server 120 using applications, such as a web browser, web servers, and various other types of computer applications, etc. Web server 120 also may receive text, audio, video, and image content from client device 102A and client security appliance device 102N, which may be stored in data store 180 for preservation and/or sharing of content.

In an example, web server 120 is coupled to one or more application servers 122 that provide application services, data, business logic, and/or APIs to client device 102A and client security appliance device 102N. In some examples, application servers 122 also may provide such services to client device 102A and client security appliance device 102N without use of web server 120.

In an example, web server 120 may provide client device 102A and client security appliance device 102N with access to one or more application server 122 services associated with anonymous cross-organization account security system 130. Such functionality also may be provided as part of one or more different web applications, standalone applications, systems, plug-ins, web browser extensions, and application programming interfaces (APIs), etc. In some examples, plug-ins and extensions generally may be referred to, individually or collectively, as "add-ons."

In an example, client device 102A and client security appliance device 102N may include an application associated with a service provided by server machine 110 (e.g., anonymous cross-organization account security system 130). For example, various types of computing devices (e.g., smart phones, smart televisions, tablet computers, smart wearable devices, smart home computer systems, etc.) may use specialized applications to access services provided by server machine 110, to issue commands to server machine 110, and/or to receive content from server machine 110 without visiting or using web pages.

In an example, functions performed by server machine 110 may also be performed by client device 102A and client security appliance device 102N, in whole or in part. In addition, the functionality attributed to a particular component may be performed by different or multiple components operating together. Server machine 110 may be accessed as a service provided by systems or devices via appropriate application programming interfaces (APIs) and data feeds, and thus is not limited to use with websites. Further, server machine(s) 110 may be associated with and/or utilize one or more anonymous cross-organization account security data exchanges.

Figure 2:
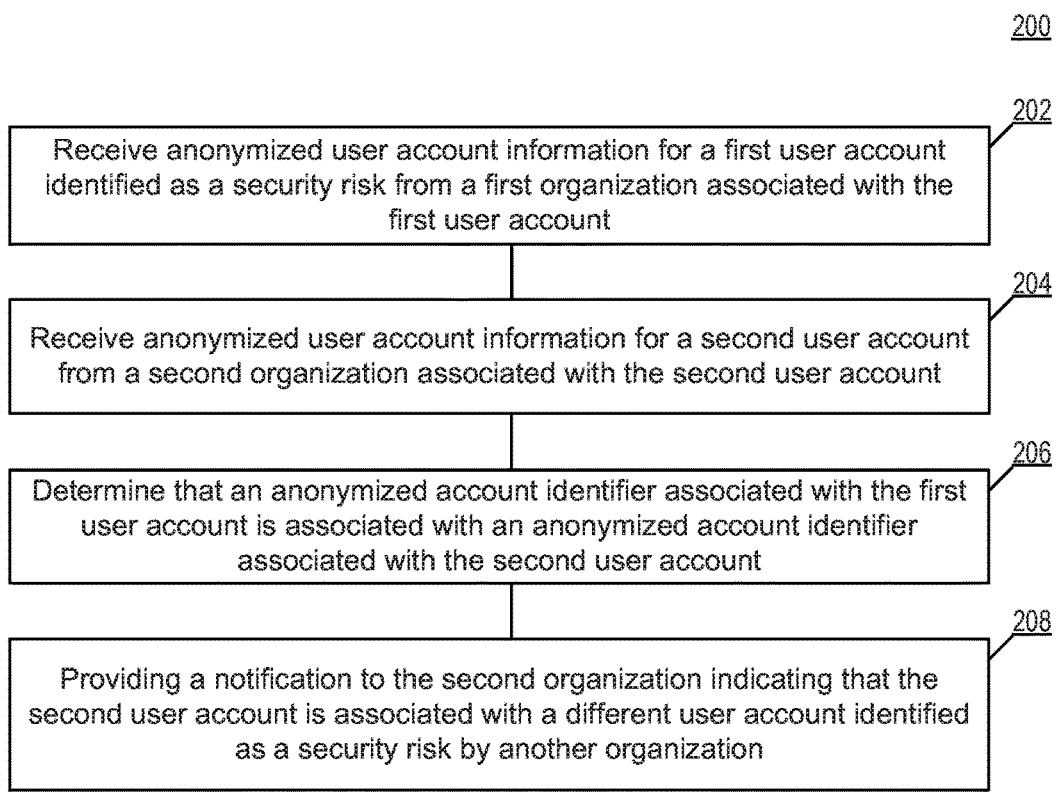
FIG. 2 is a flow diagram for providing anonymous account security services across different organizations, according to an example of the present disclosure.

FIG. 2 is a flow diagram for providing anonymous account security services across different organizations, according to an example of the present disclosure. The method 200 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 200 are described with respect to anonymous cross-organization account security system 130 for the sake of consistency. In addition, such examples generally apply to other anonymous cross-organization account security systems 130A-130N examples described herein.

Method 200 begins at block 202 when communication manager module 160 of anonymous cross-organization account security system 130 receives anonymized user account information for a first user account identified as a security risk from a first organization associated with the first user account.

In an example, security manager module 150A-150N of a client device 102A-102N determines that a user account or activity associated with a user account is a security risk. For example, account activity analyzer module 140A-140N may detect anomalous, irregular, risky, illegal, unidentified, or other suspicious activity associated with a user account. In response, security manager module 150A-150N determines that the user account associated with the activity is a security risk. Security manager module 150A-150N also may determine that a user account is a security risk based on an incident identified or reported by an organization or user.

In an example, security manager module 150A-150N determines that information about a user account associated with a security risk is to be shared with an anonymous account security data exchange. For example, security manager module 150A-150N may determine that user account information is to be shared anonymously with an anonymous account security data exchange based on user account activity, one or more reported events or incidents, or for other reasons. Security manager module 150A-150N then prepares user account information to be sent anonymously to the anonymous account security data exchange (e.g., anonymous cross-organization account security system 130).

In an example, security manager module 150A-150N anonymizes user account information associated with a user account that is to be shared with an anonymous account security data exchange. For example, security manager module 150A-150N may gather one or more pieces of user account information to transfer to the exchange. Security manager module 150A-150N also may standardize the user account information to be transferred to the exchange based on length, data type, character set, format, or some other standard used by the exchange. Security manager module 150A-150N then anonymizes one or more portions of the user account information to be sent to the exchange. For example, security manager module 150A-150N may anonymize one or more user account fields or any data associated with a user account. Such user account fields and descriptors may include, but are not limited to a unique account identifier, an account type, an account industry or sector, a geographic location of an account, account holder citizenship, an organization associated with the account, etc.

In an example, security manager module 150A-150N anonymizes one or more user account fields to render the information associated with anonymized user account fields as obfuscated, unintelligible, or indecipherable (e.g., hashed, double-hashed, triple-hashed, etc.). Such anonymization is used to protect the privacy of the user account data so that the original data remains private, secret, and unknown to any other organization or third-party, including an anonymous account security data exchange.

In an example, security manager module 150A-150N anonymizes user account data by performing one or more transformational processes on the data. For example, security manager module 150A-150N may anonymize various user account data fields using one or more cryptographic transformations, by hashing one or more of the user account data fields one or more times, by encrypting one or more of the user account data fields one or more times, and/or by transforming the user account data according to one or more other various processes, etc.

In an example, security manager module 150A-150N anonymizes user account data that is to be provided to an anonymous account security data exchange based on a standard anonymization process supported, utilized, or agreed upon by various other organizations participating in the exchange. For example, a plurality of different organizations participating in the exchange each may anonymize user account data locally prior to sending the anonymize user account data to the exchange. Anonymizing user account data consistently across the various organizations based on a common data anonymization standard allows a centralized exchange to compare and match such anonymized data without ever de-anonymizing the data, thus protecting and maintaining full data privacy.

In an example, security manager module 150A-150N applies a different standardized anonymization process to separate data fields of a user account. For example, security manager module 150A-150N may apply a first standardized data anonymization process to a first set of one or more user account fields. Security manager module 150A-150N also may apply a second or different standardized data anonymization process to a second set of one or more other user account fields. Thus, security manager modules 150A-150N implemented by different organizations consistently may anonymize one or more user account fields based on one standardized data anonymization process and consistently anonymize a second set of one or more user account fields based on a different standardized data anonymization process. In one example, security manager module 150A-150N anonymizes a unique user account identifier differently than one or more other user account fields that are to be anonymized. For example, security manager module 150A-150N may anonymize each user account data field differently prior to sending the anonymized user account data fields to an anonymous account security data exchange.

In an example, communication manager module 160A-160N of a first organization sends anonymized user account information to a centralized anonymous account security data exchange (e.g., server machine 110) to be compared against anonymized user account information submitted to the exchange by other organizations. Communication manager module 160 of server machine 110 then receives the anonymized account information from the first organization via network 104.

In one example, an organization provides a lifetime, expiration date, or time-to-live value with anonymized user account information provided to an anonymous account security data exchange. For example, such custodial information generally may instruct the exchange when to expire, archive, remove, or delete anonymized user account data submitted by an organization. An organization also may request expiration, archival, removal, or deletion of such data directly, for example, when a user account is no longer considered a security risk or threat, or when anonymized user account data is submitted by mistake.

At block 204, communication manager module 160 of anonymous cross-organization account security system 130 receives anonymized user account information for a second user account associated with the second user and maintained by a second organization. In one example, the second user account may be identified as a security risk by the second organization.

In an example, security manager module 150A-150N of a second organization determines that a user account associated with the second organization is a security risk. For example, account activity analyzer module 140A-140N of the second organization may detect anomalous, irregular, risky, illegal, unidentified, or other suspicious activity associated with the user account associated with the second organization. Security manager module 150A-150N of the second organization then determines that the user account is a security risk based on the activity associated with the user account and/or an incident identified or reported by the second organization or the user of the account. Security manager module 150A-150N then determines that user account information is to be shared anonymously with the anonymous account security data exchange based on user account activity, one or more reported events or incidents, or for other reasons. In some examples, anonymized user account information may be shared with an anonymous account security data exchange for comparison against different accounts of other organizations that were flagged as security risks by respective organizations or other parties.

In an example, security manager module 150A-150N of the second organization anonymizes one of more portions of user account information associated with the second organization. For example, security manager module 150A-150N of the second organization may anonymize one or more user account fields based on a data anonymization standard associated with an anonymous account security data exchange. The data anonymization standard used by the second organization may be the same data anonymization standard also used by the first organization and other various organization to anonymize respective user account data. Use of a common data anonymization standard maintains the privacy of underlying user account information at a centralized exchange while ensuring that such anonymized data can be compared, correlated, and matched accordingly.

In an example, communication manager module 160A-160N of the second organization sends anonymized user account information to the anonymous account security data exchange or other centralized server machine 110 to be compared against anonymized user account information provided by other organizations. Communication manager module 160 of server machine 110 then receives the anonymized account information provided by the second organization via network 104.

At block 206, anonymous account analyzer module 142 of anonymous cross-organization account security system 130 determines that an anonymized account identifier associated with the first user account is associated with an anonymized account identifier associated with the second user account.

In an example, anonymous account analyzer module 142 analyzes various anonymized user account information received from client devices 102A, 102N of various organizations. For example, anonymous account analyzer module 142 may compare one or more unique anonymized account identifiers from one organization to one or more unique anonymized account identifiers provided by at least one other organization. Examples of unique anonymized account identifiers may include, but are not limited to credit card numbers, financial account numbers, general account numbers, email addresses, messenger addresses, social media or other online handles, full addresses, partial addresses, user identification numbers, user identification codes, usernames, geographic coordinates, GUIDs or other unique identifiers, government issued identification numbers, driver license numbers, other license numbers, passport numbers, biometric signatures, hash values of biometric data (e.g., fingerprint, iris, retina, optical nerves), etc.

In an example, anonymized user account information may be comprised of one or more anonymized user account fields. For example, an anonymized user account record may include a unique account identifier, a non-unique account identifier, an account type, an account industry, an account business sector, an account use, an account jurisdiction or geographic location, an account privacy preference, citizenship of an account holder, an organization associated or affiliated with an account, an organization that manages the account, etc. Such user account fields may be used to find and filter matching anonymized account records across different organizations. Further, one or more of the user account fields in an anonymized user account record may be anonymized. Thus, an anonymized user account record generally may refer to a partially or fully anonymized set of user account fields.

In an example, account analyzer module 142 compares an anonymized user account identifier received from one organization to an anonymized user account field received from a different organization. For example, account analyzer module 142 may compare an anonymized account identifier field (e.g., e-mail addresses identifying unique accounts) from one organization (e.g., an e-mail provider) to an anonymized account record (e.g., a standard e-mail address field not serving as an account identifier) from another organization. Thus, account analyzer module 142 may compare and match corresponding or non-corresponding user account fields from user account records provided by different organizations to determine whether the corresponding or non-corresponding user account fields match or are correlated. In various examples, account analyzer module 142 may perform partial matching, exact matching, pattern matching, and other types of matching of anonymized user account data.

In an example, account analyzer module 142 compares and matches anonymized user account fields from anonymized user account records received from different organizations. For example, account analyzer module 142 may perform such comparing and matching of anonymized user account fields based on one or more comparison and matching processes associated with an anonymous account security data exchange. In one example, the comparison and matching is performed in real time, in batch mode, at scheduled times, upon request, and at other times based on one or more comparison matching processes agreed upon by members participating in the anonymous account security data exchange. Such comparison and matching processes may be defined by an international government organization, a regional government organization, a national government organization, a local government organization (e.g., state, city, municipality, etc.), an industry or sector (e.g., finance, healthcare, government, etc.), by members of the exchange, etc.

In an example, an organization may submit a query instructing account analyzer module 142 to compare one or more anonymized user account records associated with the organization to one or more various other organizations. For example, the query may instruct account analyzer module 142 to compare a single anonymized user account record or a set of anonymized user account records based on anonymized account identifier(s), date, attributes, or other criteria. Further, the query may instruct account analyzer module 142 to compare and match fields of anonymized user account records from other organizations based upon one or more attributes or criteria. For example, the query may instruct account analyzer module 142 to match anonymized user account records from a matching (and/or non-matching) account type, account industry, account business sector, account jurisdiction or geographic location, account privacy preference, account holder citizenship, etc. In some examples, where a user account record is partially anonymized, an organization may instruct account analyzer module 142 to compare and match fields of anonymized user account records from other organizations based on one or more named attributes or criteria that are not anonymized (e.g., account type='social_media', account industry='healthcare', account identifier type='email', account status='compromised', etc.).

At block 208, communication agent module 170 of communication attendant system 130 sends a notification to the second organization indicating that the second user account is associated with a different user account identified as a security risk by another organization. In an example, communication agent module 170A receives one or more anonymized user account identifiers associated with one or more anonymized user account records matched to anonymized user account records identified as security risks by one or more other organizations. The anonymized user account identifiers received by communication agent module 170A may be accompanied by one or more other anonymized or non-anonymized data fields. Further, the notification may be provided as an ad-hoc, scheduled or unscheduled message, report, data feed, etc.

In an example, security manager module 150A then de-anonymizes one or more anonymized account identifiers to allow the organization to identify and perform one or more risk mitigation activities involving the user account.

For example, in response, an organization may adjust a security risk score associated with the user account, reduce or block monetary utilization of the account, report information about the account to law enforcement authorities, disable the user account, expire a password associated with the user account, prevent the user account from performing one or more activities, reduce privileges of the account, increase monitoring of the account, delete the account, contact the real account user via a primary or secondary computing device associated with the user account, alert another organization about a data breach, publicly disclose a data breach, etc.

Figure 3:
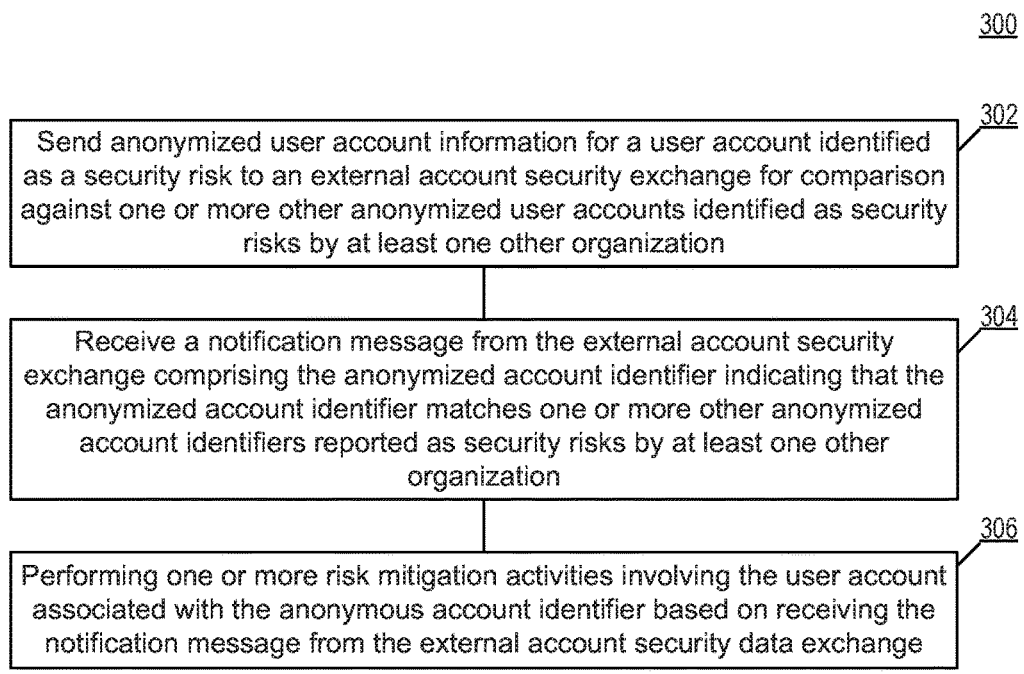
FIG. 3 is a flow diagram for utilizing anonymous inter-organizational account security services, according to an example of the present disclosure.

FIG. 3 is a flow diagram for utilizing anonymous inter-organizational account security services, according to an example of the present disclosure. The method 300 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 300 are described with respect to anonymous cross-organization account security system 130N for the sake of consistency. In addition, such examples generally apply to other anonymous cross-organization account security systems 130, 130A examples described herein.

Method 300 begins at block 302 when communication manager module 160N of anonymous account security system 130N sends anonymized user account information for a first user account identified as a security risk to an external account security exchange for comparison against one or more other anonymized user accounts received from at least one other organization. In an example, security manager module 150N anonymizes and encrypts user account information for distribution to the account security data exchange. For example, security manager module 150N encrypts anonymized user account information prior to sending the anonymized data to the exchange. Security manager module 150N may encrypt the anonymized user account data with a dedicated public key assigned to an organization by the exchange or a shared public key used by a plurality of organizations associated with the exchange. Communication manager module 160N then sends the encrypted anonymized data to the exchange.

In an example, communication manager module 160 of an account security data exchange receives the encrypted anonymized user account data provided by communication manager module 160. Security manager module 150 then, for instance, decrypts the encrypted anonymized user account data using a private key associated with the exchange. Security manager module 150 also stores and maintains the decrypted anonymized user account data for comparison and matching against other anonymized user account data submitted by different organizations.

In an example, security manager module 150 compares and matches anonymized account identifier fields of anonymized user accounts across various organizations. Security manager module 150 then notifies various organizations when one or more anonymized user account fields of a user account identified as a security risk match one or more anonymized user account fields of a different user account associated with another organization.

In an example, security manager module 150 matches anonymized user account identifiers and fields across various organizations automatically based on one or more processes associated with a centralized account security data exchange. Security manager module 150 also may compare anonymized user account data, match anonymized user account data, and notify an organization about comparison and matching results in response to a query from the organization. For example, an organization may submit a query requesting comparison of an identified set of one or more anonymized user accounts submitted by the organization against anonymized user accounts submitted by other organizations. In an example, a query submitted to the account security data exchange may comprise or reference one or more anonymized user accounts submitted to the exchange by the organization. The query also may comprise one or more instructions provided to the exchange for comparing and matching anonymized user accounts submitted by other organizations.

In an example, a query indicates one or more primary or secondary source fields to match on (e.g., account identifier, e-mail address, telephone number, etc.). The query also may indicate one or more primary or secondary target fields of anonymized user account records from other organizations to match on (account identifier, e-mail address, telephone number, etc.). In one example, an organization may wish to compare anonymized account identifiers for accounts that it has submitted to the exchange in the past week to anonymized account identifiers and anonymized e-mail address fields for accounts that other organizations have submitted to the exchange in the past sixty days.

In an example, an organization also may submit a query indicating criteria to partition or filter source data, target data, and/or match results. For example, a query submitted by an organization may instruct an account security data exchange to compare a set of one or more anonymized "source" user accounts to anonymized "target" user accounts associated with one or more countries or jurisdictions (e.g., United States, Canada, European Union, etc.), one or more industries or sectors (e.g., finance, healthcare, government, social media, e-mail, etc.), one or more time periods, etc. A query also may indicate a minimum number of matches to find before returning a positive match result or notification. For example, an organization may request a list of its anonymized user accounts that match a minimum of at least two different accounts from one or more organizations. An organization also may request a list of its anonymized user accounts that match at least one other different account from each of a minimum of at least three other organizations. Other various criteria and combinations may be applied as desired by an organization.

At block 304, communication manager module 160N of anonymous account security system 130A receives a notification message from the external account security exchange comprising at least one anonymized account identifier matching one or more other anonymized account identifiers identified as security risks by at least one other organization. In an example, communication manager module 160N receives a set of one or more of the matching anonymized user account identifiers from the exchange.

In an example, the matching anonymized user account identifiers are encrypted (by the exchange) using a public key provided to the exchange by the organization associated with the original user accounts. Security manager module 150N then decrypts the matching anonymized user account identifiers using a corresponding private key of the respective organization. Thus, in some examples, a public/private key pair used to encrypt and decrypt anonymized user account identifiers returned from the exchange is different from a public/private key pair used when providing the anonymized user account identifiers to the exchange.

In an example, security manager module 150N decrypts the encrypted anonymized user account identifiers and other anonymized data received from the exchange. For example, security manager module 150N decrypts such data to allow an organization to see the actual identity of user accounts (e.g., owned, managed, or otherwise associated with the organization), which have been matched to anonymized user accounts of other organizations. Thus, in various examples, anonymized user account data may be anonymized and de-anonymized by the party that provides the anonymized user account data to an account security data exchange.

At block 306, security manager module 150N of anonymous account security system 130A performs one or more risk mitigation activities involving the user account associated with the anonymous account identifier based on receiving the notification message from the external account security exchange. In an example, security manager module 150N adjusts a security score, a risk factor, monetary utilization, accessible features, user functionality, security settings, credentials, authentication methods, monitoring, alerting, and/or reporting associated with the user account. Such risk mitigation activities may be performed by an organization to protect or further protect user accounts from potential or existing security threats.

Figure 4:
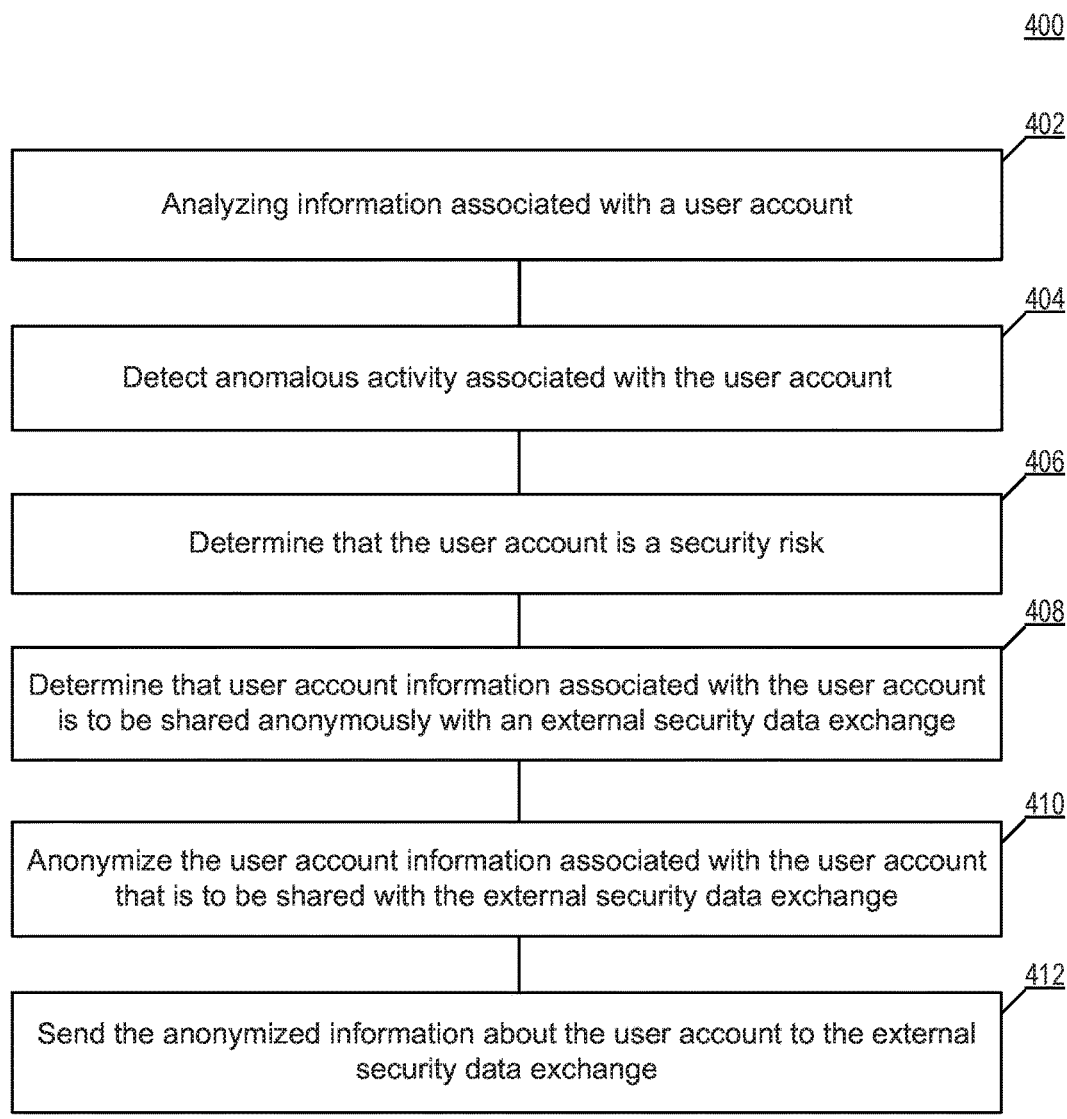
FIG. 4 is a flow diagram for providing anonymized account information to an anonymous inter-organizational account security exchange, according to an example of the present disclosure.

FIG. 4 is a flow diagram for providing anonymized account data to an anonymous inter-organizational account security exchange, according to an example of the present disclosure. The method 400 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 400 are described with respect to anonymous cross-organization account security system 130A for the sake of consistency. In addition, such examples generally apply to other anonymous cross-organization account security systems 130, 130N examples described herein.

At block 402, account activity analyzer module 140A of anonymous account security system 130A analyzes user account activity. In an example, account activity analyzer module 140A analyzes past, current, or a combination of past and current user account activity to determine behavior associated with a particular user account or similar user accounts. For example, account activity analyzer module 130A may compare user account activity to usage patterns of a particular user, usage patterns of a behavioral profile associated with the user, or usage patterns associated with fraudulent or illegal activity.

Account activity analyzer module 140A then may detect anomalous, irregular, risky, illegal, unidentified, or suspicious activity associated with a user account based on the analysis. Account activity analyzer module 140A also may provide such analysis to security manager module 150A to determine whether a user account is a security risk and whether anonymized user account information is to be sent to an anonymous account security data exchange (e.g., for comparison and matching against anonymized user account data provided to the exchange by other organizations).

At block 404, security manager module 150A of anonymous account security system 130A detects anomalous activity associated with the user account. In an example, security manager module 150A interprets user account activity collected by account activity analyzer module 140A and classifies the user account activity as anomalous, irregular, risky, illegal, unidentified, or suspicious activity. Such classification may be based on correlation to models of expected user behavior, deviation from models of expected user behavior, correlation to models of anomalous user behavior, unrecognized user behavior, etc. In addition, security manager module 150A may assign a threat level to a user account and send an alert to notify a security analyst about the activity associated with the user account.

At block 406, security manager module 150A of anonymous account security system 130A determines that a security risk is associated with the user account. In an example, security manager module 150A determines that user account activity is a security risk when the user activity originates from an unexpected location not associated with the user or the user account. For example, security manager module 150A may determine that user account activity is a security risk when the activity originates from a different continent, country, region, state, locale, zone, or other space that is not associated with the user or the user account.

In some examples, security manager module 150A determines that an account is a security risk when a user account is accessed simultaneously from two or more different locations (e.g., trusted locations, untrusted locations, or any combination thereof). Security manager module 150A also may determine that a user account is a security risk when it is detected or reported that a user account has been targeted, has been exposed to, has interacted with, or has been breached based on one or more fraudulent schemes (e.g., malware, phishing, virus, skimming, third-party data breach, etc.). Further, security manager module 150A may determine, in whole or in part, that a user account is a security risk when network traffic associated with the user account is determined to be abnormal, based on one or more characteristics of a user agent string for an application used to access or interact with a user account, or based on one or more other aspects of an application used to access interact or interact with a user account.

In an example, security manager module 150A determines that a user account is a security risk based on an incident identified or reported by an organization or user associated with an account. For example, security manager module 150A may determine that a user account is a security risk based on a notification or account configuration setting received or activated by an individual associated with an organization that manages the user account, or by the user associated with the account. Thus, a user may contact an organization or electronically self-report to an organization that a user account is a security risk.

At block 408, security manager module 150A of anonymous account security system 130A determines that the information associated with a user account is to be shared anonymously with a security data exchange. In an example, security manager module 150A accesses and analyzes operational and privacy-related instructions or rules to determine whether anonymized information associated with a user account is to be shared with an account security data exchange. For example, security manager module 150A may analyze user privacy preferences to determine whether a user has opted-in to or opted-out of sharing anonymized account information with an account security data exchange.

In an example, manager module 150A analyzes one or more data sources providing instructions or information about governmental privacy rules, industry privacy rules, organizational (self-regulated) privacy rules, or privacy best practices to determine whether to share anonymized user account information to an account security data exchange. In addition, security manager module 150A-150N may determine whether to share anonymous user account information with an account security data exchange based on user account activity, observed system activity, and/or one or more events or incidents reported by a government, an agency, another organization, the organization itself, an internal security team, an independent security team, a user, etc.

At block 410, security manager module 150A of anonymous account security system 130A anonymizes the user account information that is to be shared with the external account security data exchange. In an example, security manager module 150A standardizes one or more pieces of user account information based on a standardized data format of the exchange. Security manager module 150A then anonymizes one or more fields of user account records to be sent to the exchange.

In an example, security manager module 150A anonymizes one or more user account fields to render the original information as unintelligible, undeterminable, and indecipherable. Such anonymization protects privacy of the data so that the actual information remains secret and unknown to any other organization or third-party, including an anonymous account security data exchange. Thus, an anonymous account security data exchange may receive respective anonymized user account data from each of one or more different organizations. However, the anonymous account security data exchange does not decipher the data. Instead, the anonymous account security exchange stores, maintains, compares, searches, locates, finds, and matches various anonymized user account information (e.g., anonymized identifiers, records, fields, etc.) in their respective anonymized form(s).

In an example, security manager module 150A anonymizes user account data based one or more standardized data anonymization processes associated with the exchange. Security manager module 150A also may encrypt anonymized user account data, such as anonymized user account identifiers, records, and fields, prior to sending the anonymized user account data to an anonymous account security data exchange. For example, security manager module 150A may encrypt anonymized user account data using a public key associated with the anonymous account security data exchange. The public key may be assigned to a specific organization by the anonymous account security data exchange, or may be shared among a plurality of organizations that participate in the exchange. In examples where the public key associated with the anonymous account security data exchange is shared with multiple organizations by the exchange, each organization then may encrypt its own respective user account data with the shared public key prior to sending such data to the exchange. Anonymized data and other data may be encrypted, for example, to secure or further secure the data for transfer to the exchange.

At block 412, communication manager module 160A of anonymous account security system 130A sends the anonymized user account information to the external security data exchange for analysis. In an example, communication manager module 160A sends anonymized user account identifiers, records, fields, and other data to the exchange in an encrypted format. Communication manager module 160 of the exchange receives the encrypted anonymized user account data, and security manager module 150 of the exchange decrypts the anonymized user account data.

For example, security manager module 150 may decrypt anonymized user account data using a private key corresponding to a public key assigned specifically to an organization (e.g., by the exchange) for encrypting anonymized user account data of the organization. Security manager module 150 also may decrypt anonymized user account data using a private key corresponding to a public key shared with one or more organizations that participate in the anonymous account security data exchange. Security manager module 150 then may compare and match various anonymized user account data provided by different organizations when such information has been decrypted accordingly.

In an example, communication manager module 160A may send one or more spurious anonymized user account records to an external account security data exchange. For example, communication manager module 160A may send decoy anonymized user account information unassociated with any user account (e.g., randomized data, semi-randomized data, etc.) prepared by security manager module 150A. In one example, one or more organizations send spurious or decoy anonymized user account information to an account security data exchange to prevent other parties, including the exchange from determining a number of user accounts identified and/or submitted to the exchange as security risks.

Figure 5:
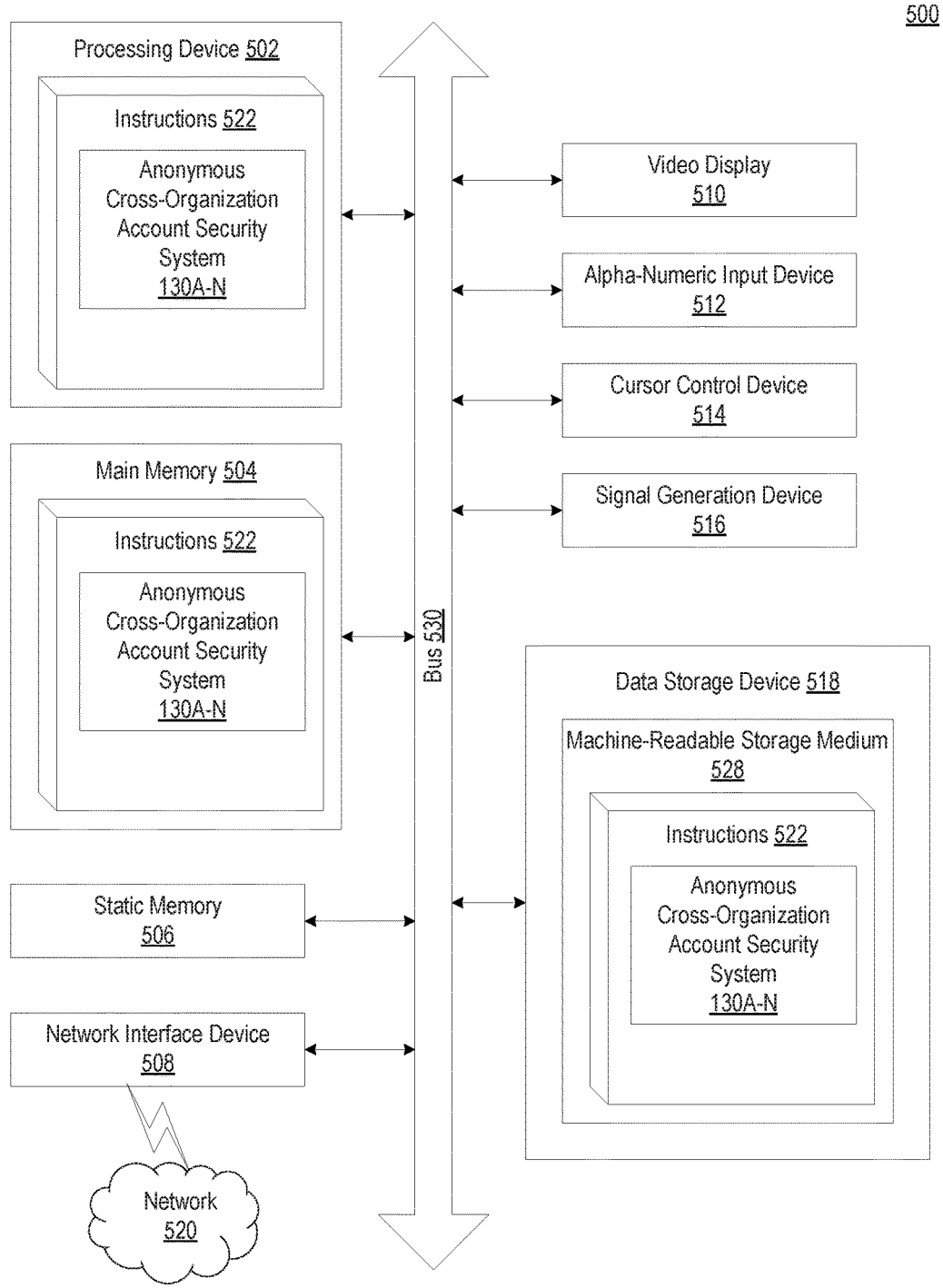
FIG. 5 is a block diagram of an exemplary computer system that may perform one or more of the operations described herein.

FIG. 5 illustrates a diagram of a machine in the exemplary form of a computer system 500, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client device in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 also may be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 also may include a network interface device 508. The computer system 500 may further include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software computer instructions) embodying any one or more of the methodologies or functions described herein. The instructions 522 also may reside, completely or at least partially, within the main memory 504 and/or within the processor 502 during execution thereof by the computer system 500, the main memory 504 and the processor 502 also constituting computer-readable storage media. The instructions 522 may be transmitted or received over a network 520 via the network interface device 508.

In one example, the instructions 522 include instructions for one or more modules of a customer management system (e.g., anonymous cross-organization account security system 130, 130A, 130N of FIG. 1) and/or a software library containing methods that call an anonymous cross-organization account security system 130, 130A, 130N. While the computer-readable storage medium 528 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing," "comparing," "associating," "applying," "transmitting," "receiving," "processing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A computer system, comprising:
    a non-transitory memory; and
    one or more hardware processors coupled to the non-transitory memory and configured to read instructions from the non-transitory memory to cause the computer system to perform operations comprising:
        receiving first anonymized user account information associated with a first user account identified as a security risk from a first organization associated with the first user account, wherein the first anonymized user account information comprises anonymized account data corresponding to a set of user account fields;
        accessing stored anonymized user account information associated with a plurality of user accounts obtained from a plurality of organizations;
        determining that a second user account from the plurality of user accounts is related to the first user account based on a comparison between first anonymized account data corresponding to a login name for the first user account and second anonymized user account data corresponding to a contact address for the second user account, wherein the comparison is performed without de-anonymizing at least one of the first anonymized user account information or the second anonymized user account information;
        identifying, from the plurality of organizations, a second organization associated with the second user account;
        providing a first notification to the second organization indicating that the second user account is associated with a security risk based on determining that the first user account is related to the second user account;
        determining that the first user account is related to a third user account with a third organization based at least in part on comparing the first anonymized account data against third anonymized account data associated with the third user account; and
        providing a second notification to the third organization indicating that the third user account is associated with the security risk based on determining that the first user account is related to the third user account.

2. The computer system of claim 1, wherein the operations further comprise:
    storing the first anonymized user account information in a local storage.

3. The computer system of claim 1, wherein the first notification is provided to the second organization in response to receiving a request to assess a security risk of the second user account associated with the second organization.

4. The computer system of claim 1, wherein the first anonymized user account information is encrypted based on a public key associated with an account security exchange.

5. The computer system of claim 1, wherein the first notification comprises one or more anonymized account identifiers for the second user account.

6. The computer system of claim 1, wherein the first anonymized user account information associated with the first user account was received from the first organization based on a detected security breach associated with the first user account.

7. The computer system of claim 1, wherein the first anonymized user account information is received based on a detected data breach associated with the first user account.

8. The computer system of claim 1, wherein the first anonymized user account information is received based on a detected anomalous activity associated with the first user account.

9. A non-transitory machine-readable medium having stored thereon machine-readable instructions executable to cause a machine to perform operations comprising:
    receiving first anonymized user account information associated with a first user account identified as a security risk from a first organization associated with the first user account, wherein the first anonymized user account information comprises anonymized account data corresponding to a set of user account fields;
    accessing stored anonymized user account information associated with a plurality of user accounts obtained from a plurality of organizations;
    determining that a second user account from the plurality of user accounts is related to the first user account based on a comparison between first anonymized account data corresponding to a login name for the first user account and second anonymized user account data corresponding to a contact address for the second user account, wherein the comparison is performed without de-anonymizing at least one of the first anonymized user account information or the second anonymized user account information;
    identifying, from the plurality of organizations, a second organization associated with the second user account;
    providing a first notification to the second organization indicating that the second user account is associated with a security risk based on determining that the first user account is related to the second user account;
    determining that the first user account is related to a third user account with a third organization based at least in part on comparing the first anonymized account data against third anonymized account data associated with the third user account; and
    providing a second notification to the third organization indicating that the third user account is associated with the security risk based on determining that the first user account is related to the third user account.

10. The non-transitory machine-readable medium of claim 9, wherein the operations further comprise:

storing the first anonymized user account information in a local storage.

11. The non-transitory machine-readable medium of claim 9, wherein the first notification is provided to the second organization in response to receiving a request to assess a security risk of the second user account associated with the second organization.

12. The non-transitory machine-readable medium of claim 9, wherein the first anonymized user account information is encrypted based on a public key associated with an account security exchange.

13. The non-transitory machine-readable medium of claim 9, wherein the first notification comprises one or more anonymized account identifiers for the second user account.

14. The non-transitory machine-readable medium of claim 9, wherein the first anonymized user account information associated with the first user account was received from the first organization based on a detected security breach associated with the first user account.

15. The-transitory machine-readable medium of claim 9, wherein the first anonymized user account information is received based on a detected data breach associated with the first user account.

16. A method, comprising:
    receiving, by one or more hardware processors, first anonymized user account information associated with a first user account identified as a security risk from a first organization associated with the first user account, wherein the first anonymized user account information comprises anonymized account data corresponding to a set of user account fields;
    accessing, by the one or more hardware processors, stored anonymized user account information associated with a plurality of user accounts obtained from a plurality of organizations;
    determining, by the one or more hardware processors, that a second user account from the plurality of user accounts is related to the first user account based on a comparison between first anonymized account data corresponding to a login name for the first user account and second anonymized user account data corresponding to a contact address for the second user account, wherein the comparison is performed without de-anonymizing at least one of the first anonymized user account information or the second anonymized user account information;
    identifying, by the one or more hardware processors from the plurality of organizations, a second organization associated with the second user account;
    providing, by the one or more hardware processors, a first notification to the second organization indicating that the second user account is associated with a security risk based on determining that the first user account is related to the second user account;
    determining, by the one or more hardware processors, that the first user account is related to a third user account with a third organization based at least in part on comparing the first anonymized account data against third anonymized account data associated with the third user account; and
    providing, by the one or more hardware processors, a second notification to the third organization indicating that the third user account is associated with the security risk based on determining that the first user account is related to the third user account.

17. The method of claim 16, further comprising:
    storing the first anonymized user account information in a local storage.

18. The method of claim 16, wherein the first notification is provided to the second organization in response to receiving a request to assess a security risk of the second user account associated with the second organization.

19. The method of claim 16, wherein the first anonymized user account information is encrypted based on a public key associated with an account security exchange.

20. The method of claim 16, wherein the first notification comprises one or more anonymized account identifiers for the second user account.

21. The method of claim 16, wherein the first anonymized user account information associated with the first user account was received from the first organization based on a detected security breach associated with the first user account.

22. The method of claim 16, wherein the first anonymized user account information is received based on a detected anomalous activity associated with the first user account.

* * * * *